(5)

United States Patent [19]

Callais et al.

[11] 3,790,700

[45] Feb. 5, 1974

[54] CATV PROGRAM CONTROL SYSTEM

[75] Inventors: Richard T. Callais, Northridge; Herbert Eisenberg, Manhattan Beach; F. Douglas Forbes, Palos Verdes Peninsula; Thomas J. Kosco, Harbor City; Harry M. Taxin, Los Angeles, all of Calif.; John B. Frost, Goodyear, Ariz.

[73] Assignee: Hughes Aircraft Company, Culver City, Calif.

[22] Filed: Dec. 17, 1971

[21] Appl. No.: 209,222

[52] U.S. Cl. .................... 178/5.1, 325/308, 325/309

[51] Int. Cl. .................... H04n 1/44

[58] Field of Search ...... 178/5.1, DIG. 13; 325/308, 325/309, 55, 66

[56] References Cited

UNITED STATES PATENTS

| | | | |
|---|---|---|---|
| 3,668,307 | 6/1972 | Face et al. | 325/308 |
| 3,696,297 | 10/1972 | Otero | 325/309 |
| 3,230,302 | 1/1966 | Bruck et al. | 178/5.1 |

*Primary Examiner*—Maynard R. Wilbur
*Assistant Examiner*—S. C. Buczinski
*Attorney, Agent, or Firm*—Martin E. Gerry; W. H. MacAllister

[57] ABSTRACT

A system for controlling CATV program viewing in a plurality of modes of operation. In a first mode of operation, a downstream digital transmission causes control means to develop first binary data for comparison in a comparator with selected-channel code data from channel means to enable a first circuit to allow a first or second category program to be selected and received by a subscriber during a predetermined temporary period of time. In a second mode of operation the enabling of a second circuit by the subscriber will only cause the control means to be enabled if the subscriber is authorized to receive that selected first category program. In a third mode of operation the enabling of the second circuit by the subscriber will enable a third circuit to allow a selected second category program to be received. In a fourth mode of operation the selection of a third category program by the subscriber will enable a fourth circuit to allow that selected third category program to be received.

35 Claims, 6 Drawing Figures

Fig. 3.
| Channel Code | | | | | Status | Decoder 59 Output | | | | | | | |
|---|---|---|---|---|---|---|---|---|---|---|---|---|---|
| A | B | C | D | E | | 61 | 62 | 63 | 64 | 65 | 66 | 67 | 68 |
| 0 | 0 | 0 | 0 | 0 | Restricted | 1 | 0 | 0 | 0 | 0 | 0 | 0 | 0 |
| 0 | 0 | 0 | 0 | 1 | Restricted | 0 | 1 | 0 | 0 | 0 | 0 | 0 | 0 |
| 0 | 0 | 0 | 1 | 0 | Premium | 0 | 0 | 1 | 0 | 0 | 0 | 0 | 0 |
| 0 | 0 | 0 | 1 | 1 | Premium | 0 | 0 | 0 | 1 | 0 | 0 | 0 | 0 |
| 0 | 0 | 1 | 0 | 0 | Premium | 0 | 0 | 0 | 0 | 1 | 0 | 0 | 0 |
| 0 | 0 | 1 | 0 | 1 | Premium | 0 | 0 | 0 | 0 | 0 | 1 | 0 | 0 |
| 0 | 0 | 1 | 1 | 0 | Premium | 0 | 0 | 0 | 0 | 0 | 0 | 1 | 0 |
| 0 | 0 | 1 | 1 | 1 | Premium | 0 | 0 | 0 | 0 | 0 | 0 | 0 | 1 |
Fig. 4.
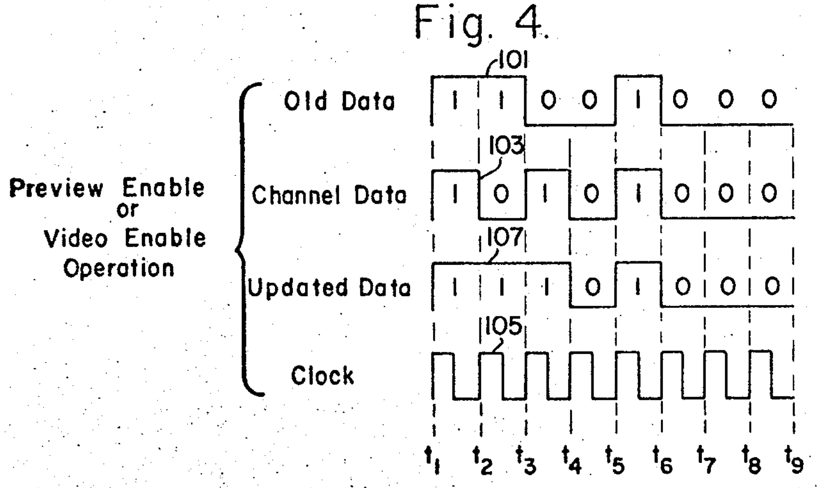
Fig. 5.
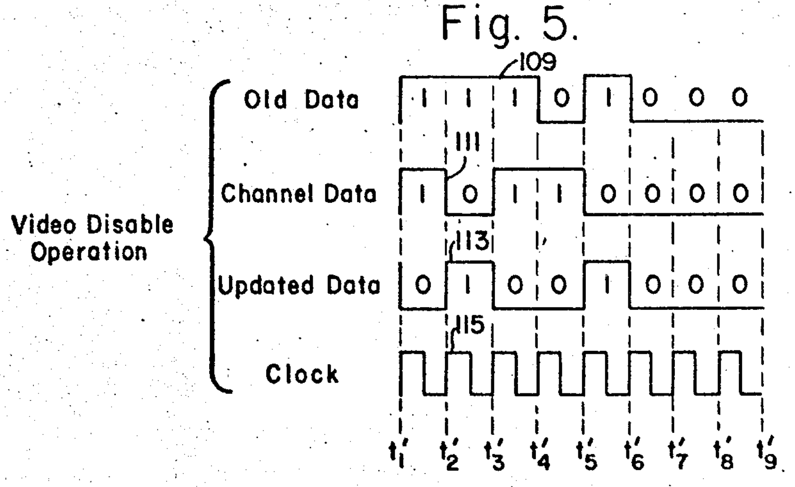

CATV PROGRAM CONTROL SYSTEM

BACKGROUND OF THE INVENTION

1. Field of the Invention

This invention relates to CATV systems and particularly to a system for controlling CATV program viewing in several modes of operation.

2. Description of the Prior Art

Although the term "CATV," as used herein, originally meant Community Antenna Television it has come to represent a much broader field of communications. Within the past decade additional services have been proposed and in some cases actually provided by some CATV systems operators. In the realm of one-way communications (i.e., from a central transmitter to the subscribers), services such as AM and FM radio programs, weather broadcasts and locally originated television programs have been provided as part of the CATV services. With the availability of two-way cable distribution networks a vast number of additional communications needs can be served. The availability of upstream communications channels allows the subscribers of a CATV system to be surveyed or polled for viewing habits or billing and, in addition, allows the subscribers to obtain services which are unrelated to television. Therefore, although the term "CATV" is used herein it should be noted that the term includes two-way communications on a much broader scale but which retains television programming as an important function.

In the past, many systems have been proposed for selectively transmitting various television programs to subscribers. In one type of system a transmitting station utilizes a coder unit to scramble the video and sound of the television programs so that a conventional television receiver cannot receive an intelligible signal. The signal being received is so distorted or jittered that it cannot be viewed normally. However, when the television receiver is equipped with a decoder to unscramble the coded signal, normal video and sound can be received. The use of the decoder to unscramble the coded signal is generally recorded for billing the subscriber at some later time.

In a second type of system, a transmitting station furnishes each of its subscribers with a list of films which it possesses, with each film having a specific selecting signal. Upon selecting a film from the list, a subscriber actuates a control which turns on his television set and searches for a free channel on one of a plurality of cables connected to a distribution box which is coupled between the subscriber's location and the transmitting station. When a free channel is found, a signal informs the subscriber that he is connected with the transmitting station through a free channel which has been located. At that time the subscriber actuates a selector control which transmits through the free channel of the cable complex to the transmitting station a signal corresponding to the film which the subscriber has selected. The station then automatically selects the required film, starts this film and causes a high frequency transmitter to transmit the television program via the free channel to the subscriber's television set. At the completion of the program, the transmission stops automatically and the television receiver is switched off automatically.

In a third type of system a private coaxial distribution network allows a transmitting station network to simultaneously transmit a plurality of unscrambled subscription television (TV) programs to each of a plurality of subscribers. Each subscriber has a five-position switch on a special converter, which is coupled to the coaxial network and to the subscriber's television antenna. In one position of the converter switch, free television is received via the subscriber's television antenna in a conventional manner. In a second position of the converter switch, voice and music can be received through the loudspeaker of the subscriber's TV set via the cable distribution network. In each of the last three positions of the converter switch, a different pay television channel can be received. It is important to note that the only television programs utilized in this system are pay television programs, since the coaxial network is effectively disconnected if the subscriber wants to receive free TV programs from his antenna. A response code, indicating the position of the converter switch, is sent back to the transmitting station so that the subscriber may be billed for watching any pay TV programs.

In a fourth type of system each of a plurality of subscribers is periodically interrogated from a central office during a preselected time slot. If a subscriber actuates a control on his subscription TV receiver set so that a channel he desires to watch may be utilized, a "yes" signal is sent back in response to the interrogation to indicate that a particular pay TV channel is being utilized or watched. A "no" response, of course, indicates that the particular pay TV channel is not being viewed. The "yes" responses are ultimately used to bill the subscribers.

In all of the above types of systems, some positive action by the subscriber must be undertaken to enable a pay TV program from the transmitting station or central office to be viewed by the subscriber. When the subscriber has undertaken that positive action, whether by setting up a decoder, positioning a switch or actuating a control, he will be subsequently billed for watching the selected TV program because it is a pay TV program. As a result, the above types of systems do not provide a period of time during which a pay TV program may be previewed without charge, and then automatically disabled unless the subscriber has taken the required action to see the balance of the program for a fee. Furthermore, none of the above types of systems provide restricted pay TV programs for which the subscriber must be eligible to watch, as well as be willing to pay.

Accordingly, it is a general object of this invention to control the availability of programs for CATV subscriber viewing.

Another object of this invention is to provide a system wherein at least one subscription program may be previewed without charge by the subscriber during at least one predetermined preview period.

Another object of this invention is to provide a system for allowing a restricted subscription program to be received only by members of a predetermined group of viewers.

Another object of this invention is to provide a system which will enable a subscriber to selectively receive non-restricted subscription programs, authorized restricted subscription programs, free previews of subscription programs, and free programs.

A further object of this invention is to provide a system which enables an authorized subscriber to switch away from a previously purchased subscription program and subsequently return to it without incurring an additional charge.

SUMMARY OF THE INVENTION

Briefly, applicants have provided a novel system for controlling CATV program viewing in a plurality of modes of operation. In a first mode of operation, control logic enables a video register to cause a first circuit to enable an output circuit to allow a subscriber to preview at least one subscription TV program during a predetermined preview period of time without charge, if the subscriber selects that program during the preview period. In a second mode of operation, the subscriber will only be allowed to receive a selected restricted subscription program, if he enables a second circuit and the control logic is enabled by a signal indicating that the subscriber is authorized to watch that restricted subscription program. In a third mode of operation, the subscriber may select a non-restricted subscription program by enabling the second circuit which, in turn, causes a third circuit to enable the output circuit to allow the non-restricted subscription program to be received. In a fourth mode of operation, the subscriber may select a free program by enabling a fourth circuit to enable the output circuit to allow the free program to be received.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein:

FIG. 3 shows in tabular form one five-bit channel code which may be used in the control of subscription TV channels.

FIGS. 4 and 5 illustrate waveforms useful in explaining the operation of the control logic circuit 47 of FIG. 2.

DESCRIPTION OF THE PREFERRED EMBODIMENT

Figure 1:
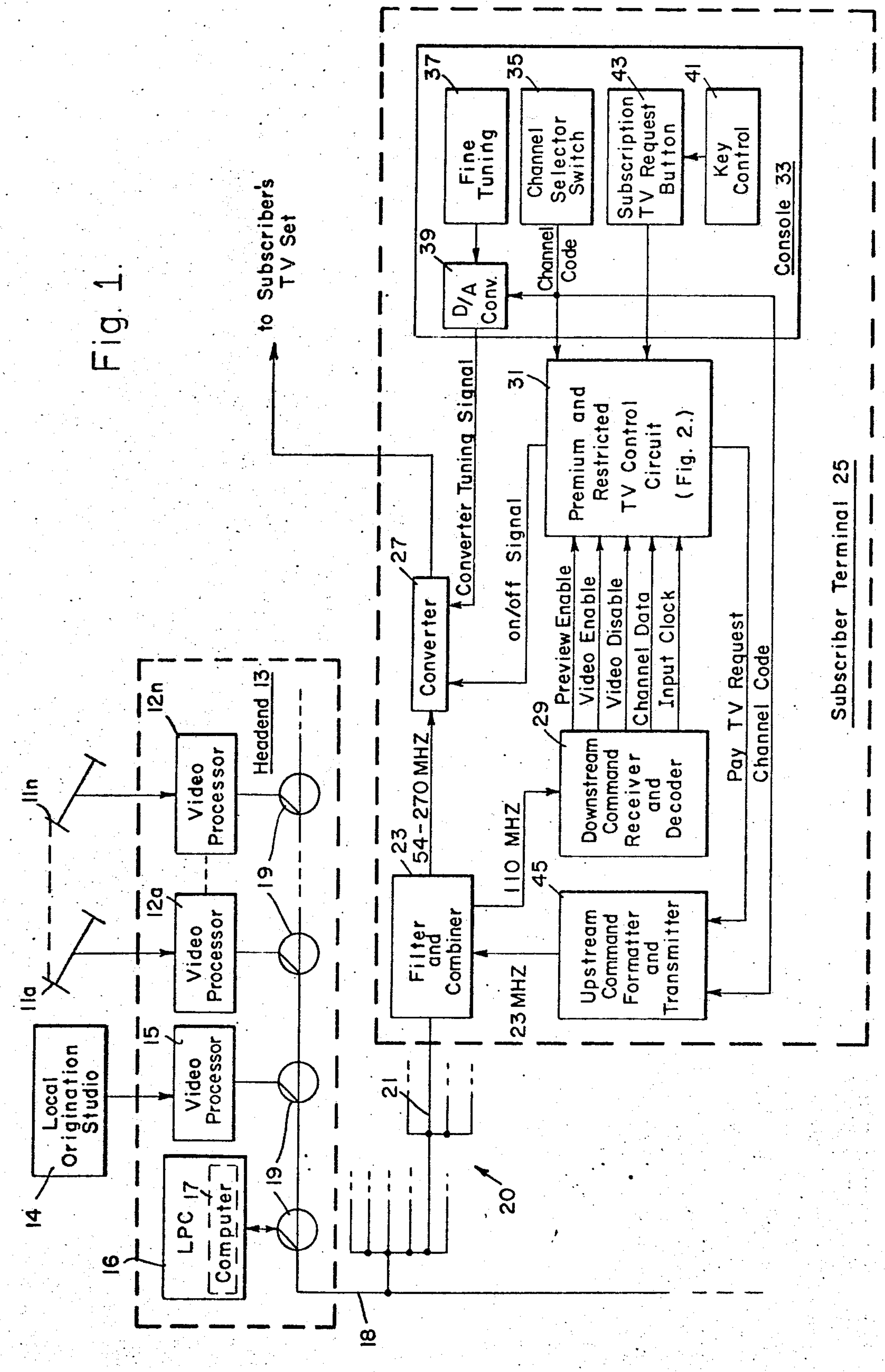
FIG. 1 is a schematic block diagram of a two-way CATV system which incorporates the invention.

Referring now to the drawings, FIG. 1 discloses a two-way CATV (cable television) system which incorporates the invention. Television (TV) and radio broadcast signals transmitted through the air are received by a plurality of elevated receiving antennas 11*a* through 11*n* for subsequent processing by a plurality of video processors 12*a* through 12*n*, which are located at a headend site 13. Signals from a local origination studio 14, which may be located at some distance from the headend site 13, are supplied for subsequent processing to a video processor 15 at the headend site 13. A local processing center (LPC) 16 at the headend site 13 includes a computer 17. The LPC 16 allows two-way communications between the subscribers and the headend site 13. Each of the outputs of the LPC 16 and video processors 12*a* through 12*n* and 15 is frequency multiplexed onto a main trunk line 18 with the other outputs via its associated directional coupler 19. In a downstream transmission the television and radio signals might occupy a large part of the frequency range from 54 MHz to 270 MHz, for example. A carrier centered about 110 MHz, for example, might accommodate the downstream digital data. The combined signals are transmitted downstream from the headend site 13 to a plurality of subscriber terminals. In an upstream transmission, digital data responses in, for example, the 21 to 25 MHz frequency range with a center frequency of 23 MHz and video transmissions in, for example, the 5 to 21 MHz frequency range may be respectively received by the LPC 16 and video processor 15.

It is understood, of course, that the frequency ranges mentioned above are for the purpose of explanation only and should not be understood to limit the scope of the present invention. The exemplary frequencies mentioned above correspond roughly to the bandwidths of presently available commercial CATV equipment.

The downstream transmission of the video band and digital signals goes through the main trunk line 18 and is split off into a distribution network 20 until it is channeled through a cable drop line 21 into a filter and combiner circuit 23 located within a subscriber terminal 25. The filter and combiner circuit 23 separates the digital data from the video band and routes the television and radio signals to a converter 27 and the digital data to a downstream command receiver and decoder 29. The downstream command receiver and decoder 29 may include a demodulator circuit (not shown) to remove the transmitted carrier frequency, a Manchester decoder (not shown) to separate input clock pulses from a digital code, and a decoder (not shown) to extract channel data as well as any one of a group of commands such as preview enable, video enable, and video disable. The commands, channel data and input clock pulses are applied to a premium and restricted TV control circuit 31 which controls the "on" and "off" status of the converter 27. In an "on" condition the converter 27 is allowed to pass a selected video channel within the video band to a subscriber's TV antenna terminals for viewing. In an "off" condition the converter is disabled, thereby preventing any video from being applied to the subscriber's TV set. While the output of the converter 27 is shown and described as going to the subscriber's TV set, it should be obvious that the converter 27 may be an integral part of the subscriber's TV set rather than ancillary to it.

The operation of the premium and restricted TV control circuit 31 is controlled from a console 33 and has four modes of operation. At the console 33 a channel selector switch 35 determines which TV channel is desired by the subscriber, while fine tuning control 37 allows for a close adjustment in the channel tuning. The channel selector switch 35 generates, for example, a five-bit channel code which is applied to the control circuit 31, as well as to a digital-to-analog (D/A) converter 39, to indicate the selected TV channel. A digital signal from the fine tuning control 37 is also applied to the D/A converter 39. The D/A converter 39 combines the digital information from the channel code and from the fine tuning control 37 and generates an analog converter tuning signal which is used to tune a varactor (not shown) in the converter 27, thereby allowing signals from the finely tuned selected channel to be applied from the converter 27 to the subscriber's TV set at a predetermined output frequency.

In a first mode of operation, the computer 17 in the LPC 16 transmits a preview enable command downstream to the control circuit 31 to allow a subscription TV program to be previewed on a predetermined channel. Any subscriber may view the subscription TV program being previewed if he positions the channel selector switch 35 to that channel within the preview period. If the subscriber selects the channel in which a subscription TV program is being previewed, he will be allowed to see that TV program for a predetermined length of time without charge. If the subscriber desires to watch the completion of the previewed program, he would have to insert a key in a key control unit 41 which enables a subscription TV request button 43 to be pressed. If the subscriber presses the button 43 before, or even after, the completion of the preview period, he will be allowed to watch the rest of that premium program and will be billed accordingly. By pressing the button 43, a pay TV request signal is generated by the control circuit 31 and applied to an upstream command formatter and transmitter unit 45 to which is also applied the channel code from the channel selector switch 35. The formatter and transmitter unit 45 combines the pay TV request signal and channel code with an internally generated station address code. This combination of signals is then modulated onto the preselected upstream carrier frequency. This upstream carrier is applied through the filter and combiner unit 23 and transmitted upstream through the cable drop line 21, the distribution network 20 and the main trunk line 18 to the LPC 16 where it is processed by the computer 17. The computer 17 records the subscriber's channel address and the channel selected for billing purposes and then initiates a downstream digital transmission at the center frequency of 110 MHz which is ultimately decoded by the receiver and decoder unit 29 as a video enable command. This video enable command confirms that the subscriber has been billed and allows the control circuit 31 to keep the converter 27 turned on after the termination of the preview period if the pay TV request was made before the completion of the preview period, or turns on the converter 27 if the pay TV request was made after the termination of the preview period.

In a second mode of operation, the subscriber may initiate a request to receive a restricted category subscription program. This is accomplished at the console 33 by the subscriber inserting his key in the key control circuit 41 and pressing the subscription TV request button 43 which enables the control circuit 31 to generate the pay TV request signal. However, the subscriber will not be immediately allowed to receive the restricted program. The pay TV request signal will be sent upstream to the LPC 16, and the computer 17 will search its memory to see if the subscriber is one of the persons on its restricted list of persons authorized to receive the requested program. Restricted lists, for example, may be respectively composed of groups of doctors, groups of lawyers, or other groups of subscribers sharing a common interest. Restricted programs therefore might comprise programs of interest to only those selected groups of persons. For example, a medical operation may be only useful to doctors; lectures on legal strategies, developments or training courses would only be of interest to the legal profession; or police tactics, such as criminal detection techniques or riot or crowd control, would only be of interest to law enforcement officers. In the event the computer 17 finds the terminal address of the subscriber on its restricted authorized viewer list for that type of program it will transmit downstream to the subscriber terminal 25 a video enable command which will allow the control circuit 31 to process the channel data so that the converter 27 is placed in an "on" condition to allow the subscriber to receive the restricted program. Of course, if the subscriber's terminal address is not on the computer's authorized viewer list, no video enable command is sent to the subscriber terminal 25. Under this mode of operation therefore, only previously authorized persons can receive restricted category programs.

In a third mode of operation, a subscriber can gain immediate access to a non-restricted category subscription program by inserting his key in the key control circuit 41 and pressing the subscription TV request button 43. This operation will enable the control circuit to immediately turn on the converter 27 and therefore allow the selected non-restricted subscription program to be received without delay. As described in the second mode of operation, the depression of the subscription TV request button 43 enables the control circuit 31 to generate a pay TV request signal which is transmitted upstream to the LPC 16. Since a non-restricted program is selected by the subscriber, the LPC 16 will automatically send, during its subsequent operation, a video enable signal to confirm the billing and to keep the converter 27 turned on. It should be noted that the subscriber will still receive the non-restricted subscription program even if a video enable signal is not transmitted from the LPC 16.

The computer 17 causes the LPC 16 to send a video disable signal to the control circuit 31 to turn the converter 27 off at the completion of the restricted category program of the second mode of operation; at the completion of the non-restricted category program of the third mode of operation; or at the completion of the preview period of the first mode of operation, if the subscriber has not actuated the key control 41 and request button 43 within the preview period. It should be noted at this time that both restricted category or non-restricted category programs may be previewed during the first mode of operation.

In a fourth mode of operation, if the channel selector switch 35 is positioned to receive a non-subscription category TV program, or free TV program, the channel code will enable the control circuit 31 to generate an "on" control signal to turn the converter 27 on, so that the selected free TV program may be received at the subscriber's TV set.

Figure 2:
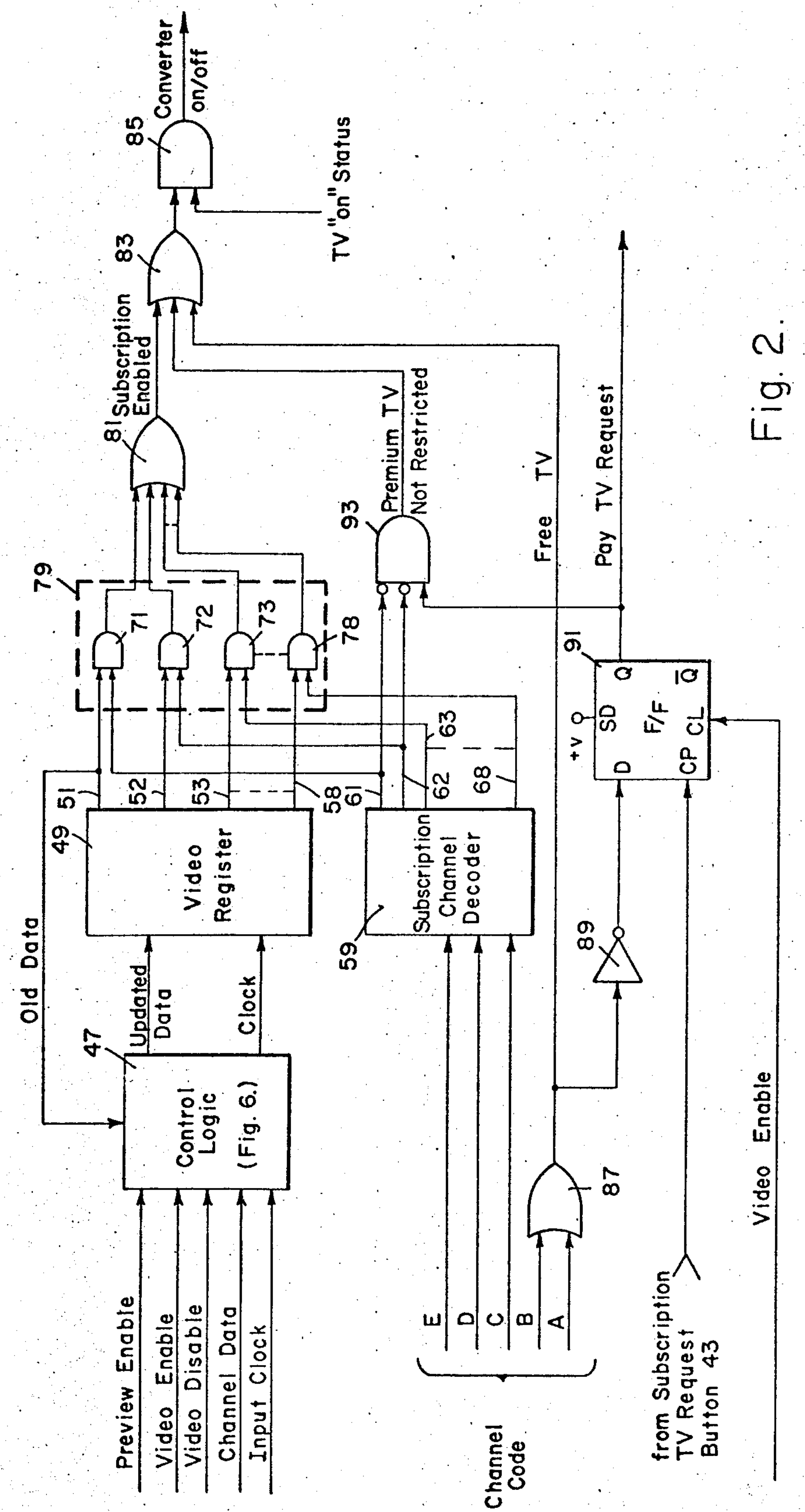
FIG. 2 is a schematic block diagram of the premium and restricted TV control circuit of FIG. 1.

The premium and restricted TV control circuit 31 will now be more fully discussed by referring to FIG. 2. In FIG. 2, the channel data, input clock pulses, and one of the preview enable, video enable, and video disable commands are applied to a control logic circuit 47 to initiate the operation of the control circuit 31. The control logic 47 applies clock pulses along with a serial stream of, for example, eight bits of updated data to a video register 49. The video register 49 may be a shift register containing eight flip-flops (not shown). Each of the eight flip-flops stores one bit of the eight-bit updated data in order to produce eight outputs, 51 through 58. This video register 49 stores information as to which subscription TV channels have been enabled for viewing, either via a preview enable command in the first mode of operation or a video enable command in the second or third mode of operation.

When the subscriber positions the channel selector switch 35 to a channel, a five bit channel code A, B, C, D, E is generated. When the subscriber has selected a subscription TV channel, which may either be restricted or non-restricted, both A and B are in a binary "0" state or condition. The C, D and E portion of the channel code is applied to a subscription channel decoder 59 which, for example, can be similar to the decoders/demultiplexers discussed from page 9–160 to 9–166 of *The Integrated Circuits Catalog for Design Engineers*, First Edition, of Texas Instruments, Inc. The subscription channel decoder 59 converts the three binary bits C, D and E to eight output lines 61 through 68. When A and B are both in binary "0" states, the output lines 61 through 68 of the decoder 59 represent the subscription restricted or premium channel that the subscriber has selected with the channel selector switch 35.

One example of a channel code A, B, C, D, E which may be used to control the selection of restricted and premium subscription channels is illustrated in FIG. 3. When A and B are both in binary "0" states, the output lines 61 through 68 of the decoder 59 represent the restricted or premium subscription channel that the subscriber has selected. At this time, a "1" state at any of the outputs 61 through 68 indicates that a subscription, and not a free, channel has been selected by the subscriber. A "1" state from either of the outputs 61 and 62 designates the selection of a restricted channel. A "1" state from any of the outputs 63 through 68 designates the selection of a premium, or non-restricted, channel.

The outputs 51 through 58 of the video register 49 are respectively compared with the outputs 61 through 68 of the subscription channel decoder 59 in respective AND gates 71 through 78 contained in a channel comparator 79. Each of the AND gates 71 through 78 in the comparator 79 has its output coupled to a different input of an OR gate 81. When the channel selected by the subscriber is one of the enabled channels stored in the video register 49, the AND gate in the comparator 79 associated with the selected and enabled channel develops a binary "1" output which is applied through the OR gate 81, then through another OR gate 83 to one input of an AND gate 85. A second input to the AND gate 85 is a TV "on" status signal from the subscriber's TV set, which is in a "1" state when the TV set is "on," and in a "0" state when the TV set is "off." The output of the AND gate 85 is the on/off signal that controls the on/off status of the converter 27 (FIG. 1). A "1" output from the AND gate 85 turns on the converter 27, while a "0" output from the AND gate 85 turns off the converter 27. It is therefore obvious that the converter will be turned "off" when the subscriber's TV set is turned off.

If, for example, the subscriber has selected that channel which causes the output 63 to go to a "1" state, the AND gate 73 will produce a "1" state output if the output 53 from the video register 49 is in an enabled "1" state. The "1" state output of the AND gate 73 will then be passed sequentially through the OR gates 81 and 83 and to the AND gate 85 to turn on the converter 27.

In the fourth mode of operation, if the channel selected by the subscriber is such that either the A or B portion of the channel code is in a "1" state, OR gate 87 will be enabled to provide a "1" state signal which will be sequentially passed through the OR gate 83 and AND gate 85 to enable the converter 27 so that the selected free channel may be received by the subscriber. In either the second or third mode of operation, both of the A and B portions of the channel code are in a "0" state, thereby preventing the OR gate 87 from causing the converter 27 to be turned on.

In the second mode of operation, when the channel selected by the subscriber is a restricted channel, one of the restricted outputs 61 and 62 of the decoder 59 will change to a "1" state. If this restricted channel has not been previously enabled via the video register 49, the comparator 79 will not enable the OR gate 81 to develop a subscription enable signal. As a result, the uppermost input of the OR gate 83 will be in a "0" state. In addition, as specified before, the selection of a subscription channel will cause the A and B signals to both be in a "0" state. As a result, the OR gate 87 will develop a "0" state output which is applied to the lowermost input of the OR gate 83. The "0" state output of the OR gate 87 will also be inverted by an inverter 89 and applied to the D input of a D flip-flop 91. When the subscriber depresses the subscription TV request button 43 on the console 33, a "1" state output is applied to the CP (clock pulse) input of the flip-flop 91 which causes its Q output to go to a "1" state. The Q output of the flip-flop 91 is applied to the lower input of an AND gate 93. The inverted upper two inputs of the AND gate 93 are coupled to the restricted outputs 61 and 62 of the subscription channel decoder 59. If the subscriber had selected a subscription TV channel which was not restricted the outputs 61 and 62 would both be in "0" states and the AND gate 93 would produce a "premium TV, not restricted" enabling signal which would be sequentially passed through the OR gate 83 and AND gate 85 to turn on the converter 27. However, it was specified that the subscriber had selected one of the two restricted channels such that either output 61 or output 62 is in a "1" state. Assume that the restricted channel selected is such as to place the output 62 in a "1" state. That "1" state output 62, which is inverted at the input of the AND gate 93, will disable the AND gate 93 and prevent that restricted channel from being immediately viewed, even though a pay TV request signal had been generated.

The pay TV request signal will be placed on an upstream transmission in the manner previously described and received by the LPC 16, and the associated restricted list searched by the computer 17. Assuming that the computer 17 finds the terminal address on its restricted list, it will cause a video enable signal to be transmitted downstream and processed by the control logic 47 such that the video register 49 will now develop a "1" state at its output 52 to indicate that the selected restricted channel is now enabled. The "1" state outputs 52 and 62 will now enable the AND gate 72 to generate a "1" state signal which is sequentially passed through the OR gates 81 and 83 and the AND gate 85 to turn on the converter 27 to enable the selected restricted channel to be received. At the same time that the video enable command is applied to the control logic 47 it is applied to the CL (clear) input of the flip-flop 91 to cause the Q output of the flip-flop 91 to change to a "0" state. By this means, the AND gate 93 is prevented from allowing any other subscription TV channel from being selected and viewed without the subscription TV request button 43 being pressed again. Of course, any other channel that remains in an enabled condition, as stored in the video register 49, can still be enabled for viewing, but via the OR gate 81 rather than the AND gate 93.

In the third mode of operation the selection of a non-restricted subscription TV channel will disable the OR gate 87 by applying two "0" state inputs thereto. Furthermore, the outputs 61 and 62 of the subscription channel decoder 59 will both be "0" states, which are inverted at the upper two inputs of the AND gate 93. The depression of the subscription TV request button 43 will cause the Q output of the flip-flop 91 to apply a "1" to the lowest input of the AND gate 93. The AND gate 93 will therefore be enabled to apply a "1" signal through the OR gate 83 and AND gate 85 to turn on the converter 27. In the meantime, the "1" output from the Q side of the flip-flop 91, or pay TV request signal, is transmitted upstream to the LPC 16 for billing purposes. A video enable signal is subsequently received at the subscriber terminal 25, as described previously, which causes the video register 49 to store and indicate at its output the fact that the selected non-restricted, subscription channel has been enabled. The comparator 79 compares the enabled channel signal from the video register 49 with the selected channel signal from the decoder 59 and causes a "1" output therefrom to be passed through the OR gates 81 and 83 to keep the converter in an "on" condition. As explained previously, the video enable signal also clears the flip-flop 91, causing its Q output to change to a "0" state, thereby disabling the AND gate 93. This third mode of operation gives the subscriber immediate access to a selected non-restricted subscription program via the "premium TV, not restricted" enabling signal from the AND gate 93, which is used to turn on the converter 27. Upon receipt of the video enable signal a new route for the enabling signal through the OR gate 81 is opened and the route through the AND gate 93 is closed.

In the first mode of operation, the computer 17 in the LPC 16 automatically, without any action by the subscriber, generates a preview enable signal. This preview enable signal is automatically processed by the control logic 47 to supply updated data to the video register. As a result, the video register 49 stores information as to the channel which is being previewed. If the subscriber positions his channel selector switch 35 to that channel being previewed, the comparator 79 will generate an enabling signal which will be sequentially passed through the OR gates 81 and 83 and the AND gate 85 to turn on the converter 27. The subscriber may then watch, without charge, the program being previewed.

Each time that channel data and input clock pulses are applied to the control logic 47, the output 51 of the video register 49 is also applied to the control logic 47. The first bit stored in the register 49, now at the output 51, is applied as old data to the control logic 47 for comparison with the first bit of the incoming channel data at an input clock pulse time. During the second input clock pulse time, a bit of updated data is entered into the register 49, causing the output 58 to correspond thereto, and at the same time the bit that had been stored at the output 52 is now shifted up to the output 51 for comparison with the second bit of the channel data. In this manner updated data is serially shifted into the register 49 at the same time that old data is serially shifted out for comparison with the channel data in the control logic circuit 47. It should be noted that old data and channel data are only compared in the control logic circuit 47 when a preview enable, video enable or video disable command is received. Reference will now be made to FIGS. 4 and 5 to further explain the manner in which the old data is compared with the channel data to produce updated data.

In FIG. 4, either a preview enable or a video enable operation is illustrated through waveshapes. Assume that the old data, represented by the waveform 101, consists of the binary number 11001000. Further assume that the incoming channel data, represented by the waveform 103, has the binary number 10101000. The eight clock pulses, which occur only after one of the preview enable, video enable and video disable commands, are represented by the waveform 105 and are respectively initiated at the times $t_1$ through $t_8$, with the eighth clock pulse terminating at time $t_9$. After receiving either the preview enable or the video enable command it is necessary to cause the video register 49 to store a signal (or signals) indicative of the channel (or channels) newly enabled without changing the status of the previously enabled channels. As a result, the updated data, represented by the waveform 107, is in a "1" state any bit time that the old data is in a "1" state at a clock pulse time, regardless of the state of the input channel data. This is illustrated by comparing the first and second bits of each of the waveforms 101 and 103 with the first and second bits of the waveform 107, which respectively occur during the periods $t_1 - t_2$ and $t_2 - t_3$. It therefore follows that whenever a bit of the old data is in a "0" state condition, the corresponding updated data will only develop a "1" state when the channel data is in a "1" state. This is illustrated by comparing the third and fourth bits of each of the old data and channel data with the updated data, which occur during the clock periods $t_3 - t_4$ and $t_4 - t_5$. The remaining four bits of the waveforms 101, 103 and 107 follow the operation previously described.

In a video disable operation it is required that whenever any bit of the channel data is in a "1" state, any corresponding "1" state bit of old data be changed to a bit of "0" state updated data in order to prevent that channel from being viewed. This operation results after the end of a preview period if the subscriber has not caused a pay TV request signal to be generated by the control logic 31, or at the completion of a premium or restricted subscription TV program. The waveforms 109, 111, 113 and 115 in FIG. 5 respectively represent the old data, channel data, updated data and clock pulses which occur during the periods $t_1' - t_2'$ through $t_8' - t_9'$. As can be readily seen in FIG. 5, whenever a bit of channel data is in a "1" state, the corresponding bit of updated data is in a "0" state to prevent subsequent viewing of that channel; and whenever a bit of the channel data is in a "0" state, the corresponding bit of updated data remains in the same state as the corresponding bit of old data at that clock pulse time.

Figure 6:
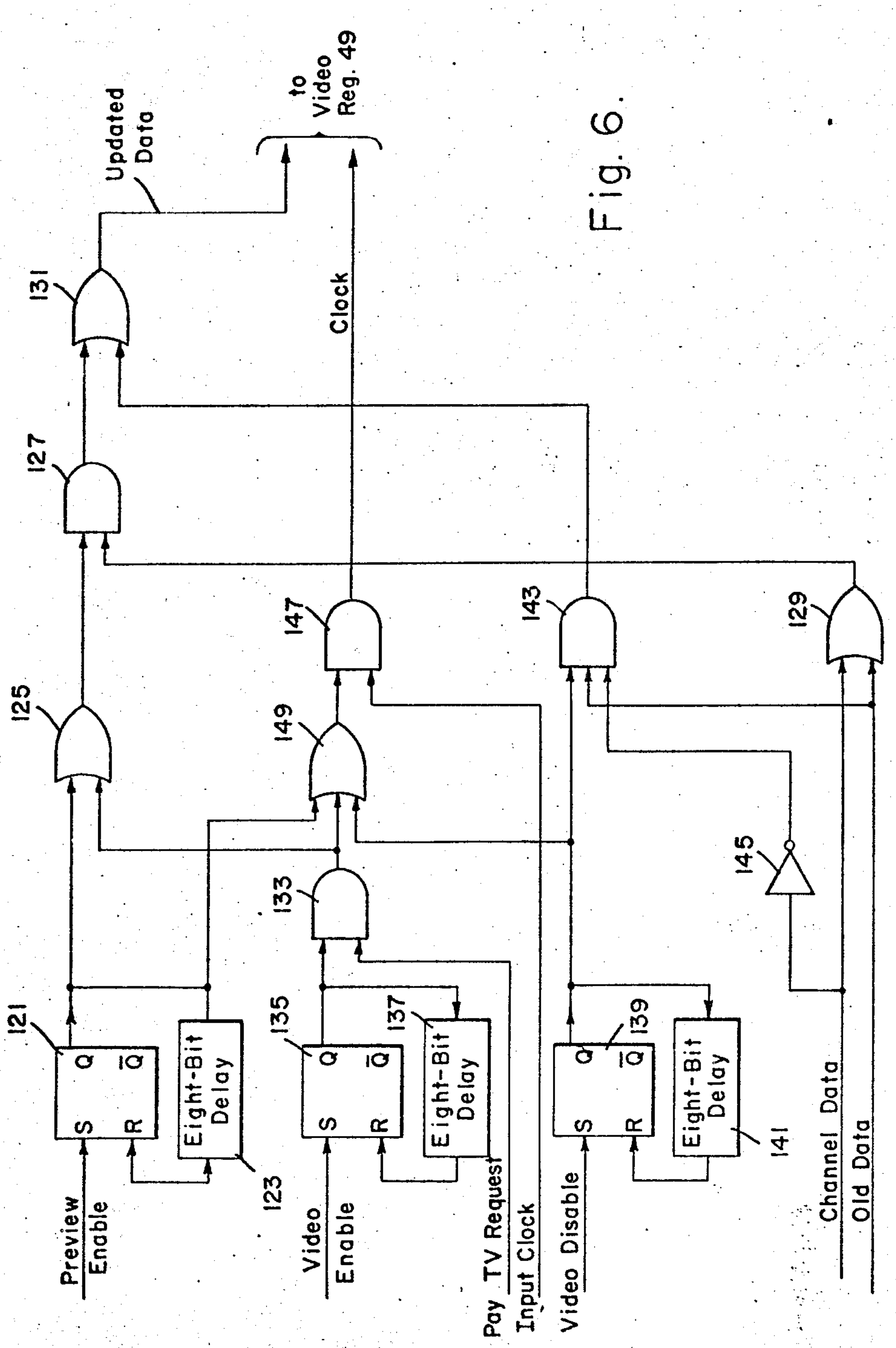
FIG. 6 is a schematic block diagram of the control logic circuit 47 of FIG. 2.

FIG. 6 discloses one mechanization of the control logic 47 (FIG. 2) for accomplishing the above-described operation of the control circuit 31 (FIG. 1) in response to each of the preview enable, video enable and video disable commands. As specified before, each of these commands from the LPC 16 is followed by eight bits of binary information.

A preview enable operation starts with the application of a preview enable command to the set side of an R-S flip-flop 121, causing the Q output of the flip-flop 121 to change to a binary "1." The flip-flop 121 remains in this condition until the "1" has passed through a delay circuit 123, eight bits in length, to reset the flip-flop 121. During the time the flip-flop 121 is in this set condition, the "1" from its Q output is applied through the upper input of an OR gate 125 to the upper input of an AND gate 127. Both of the old data and channel data are applied as inputs to an OR gate 129. As a result, the OR gate 129 will apply a "1" to the lower input of the AND gate 127 whenever either the old data or channel data is in a "1" state, and will apply a "0" to the lower input of the AND gate 127 whenever both of the old data and channel data are in " 0" states. The output of the AND gate 127 is applied to the upper input of an OR gate 131. As will be explained more fully later, the lower input of the OR gate 131 is in a "0" state at this time, since no video disable signal is present during this preview enable operation. Therefore, the output of the OR gate 131 will be determined by the output of the OR gate 129 as previously described and in conformance with the teaching of FIG. 4. The output of the OR gate 131 is the updated data that is sequentially applied to the video register 49.

The video enable operation is very similar to the preview enable operation. As previously discussed, when the subscriber depresses the subscription TV request button 43 (FIG. 1), a video enable signal is subsequently sent into the control circuit 31 from the LPC 16. The "1" state pay TV request signal from the flip-flop 91 (FIG. 2) is applied to the lower input of an AND gate 133, while the "1" state video enable signal is applied to a flip-flop 135 and delay circuit 137 combination, which corresponds in structure and operation of the flip-flop 121 and delay circuit 123 combination previously discussed. The "1" state Q output of the flip-flop 135 is applied to the upper input of the AND gate 133 during the eight bit times of the video enable operation. Since both inputs to the AND gate 133 are binary "1's" during the video enable operation, the AND gate 133 will enable the OR gate 125 to develop and apply a "1" to the upper input of the AND gate 127 during the video enable operation. The resultant operation of the AND gate 127 is then controlled by the output of the OR gate 129 in a manner identical to that discussed before in relation to the preview enable operation.

The video disable operation is initiated with the application of the video disable signal to a flip-flop 139 and delay circuit 141 combination, which corresponds in structure and operation to the flip-flop 121 and delay circuit 123 combination previously discussed. The "1" state Q output of the flip-flop 139 and the old data are respectively applied to two of the inputs of an AND gate 143, while the channel data is inverted by an inverter 145 and applied to the third input of the AND gate 143. The output of the AND gate 143 is applied to the lower input of the OR gate 131. Since there is no preview enable or video enable signal occurring during the video disable operation, the outputs of the OR gate 125 and AND gate 127, and hence the upper input to the gate 131, are all in a "0" state condition. Therefore, the binary state of the updated data at the output of the OR gate 131 is determined by the output state of the AND gate 143. Since the channel data is inverted by the inverter 145, the AND gate 143 will develop a "0" output whenever the channel data is in a "1" state. When the channel data is in a "0" state, the output state of the AND gate 143 will repeat the logical state of old data at that time, as shown in FIG. 5.

As specified earlier, only eight clock pulses are processed after each preview enable, video enable or video enable command. The input clock pulses from the decoder 29 (FIG. 1) are applied to the lower input of an AND gate 147, while the output of an OR gate 149 is applied to the upper input of the AND gate 147. The three inputs to the OR gate 149 are basically controlled by the preview enable, video enable and video disable commands, respectively. The Q outputs of the flip-flops 121 and 139 are respectively applied to two of the inputs of the OR gate 149, while the output of the AND gate 133 is applied to the third input of the OR gate 149. As a consequence, whenever any of these three commands are applied, the OR gate 149 will develop and apply a "1" state signal to the upper input of the AND gate 147 for eight bit times or input clock pulse intervals. With the application of input clock pulses thereto, the AND gate 147 will allow eight clock pulses to pass therethrough to the video register 49 to enable the register 49 to receive and store the eight bits of updated data. Subsequent input clock pulses will be blocked by the AND gate 147 at the termination of the applicable preview enable, video enable or video disable operation.

The invention thus provides a system for controlling CATV program viewing in a plurality of modes of operation. A first mode allows a subscriber to preview a subscription program for a predetermined period without charge. A second mode allows a subscriber to receive a restricted subscription program if he so requests and is eligible to receive it. A third mode allows a subscriber to receive a non-restricted subscription program if he so requests. A fourth mode allows a subscriber to receive a non-subscription program if he so desires.

While the salient features have been illustrated and described, it should be readily apparent to those skilled in the art that modifications can be made within the spirit and scope of the invention as set forth in the appended claims.

What is claimed is:

1. In a subscription television network for supplying subscription television programs to a plurality of subscription television sites, each site including a selective gating circuit, a system at each site for controlling the operation of the selective gating circuit, said system comprising:

first means responsive to digital data for generating channel enabling data for at least one subscription television program on an associated predetermined subscription television channel during a first mode of operation, said first means including a video register for storing said channel enabling data;

second means for developing channel selection data in response to the selection of a subscription television channel;

third means coupled to said first and second means and to the selective gating circuit for generating a first enabling signal when the predetermined subscription channel is the selected channel during the first mode of operation, the selective gating circuit responding to the first enabling signal for allowing the selected subscription television program to pass; and fourth means for generating a request signal in response to a selection of a first category subscription television program on a preselected channel in a second mode of operation to cause said first means to subsequently generate channel enabling data for the preselected channel if the subscription television site is authorized to receive the first category program.

2. The system of claim 1 further including:

fifth means, coupled to the selective gating circuit and said fourth means, being responsive to the request signal in a third mode of operation for generating a second enabling signal to allow the selective gating circuit to pass a second category subscription television program.

3. The system of claim 2 further including:

sixth means, coupled to the selective gating circuit, being responsive to the selection of a non-subscription channel in a fourth mode of operation for generating a third enabling signal to allow the selective gating circuit to pass a non-subscription program.

4. The system of claim 1 wherein said first means includes:

a control logic circuit responsive to the digital data for developing updated data; and a storage within said video register circuit, coupled to said control logic circuit, being responsive to the updated data for developing old data indicative of the subscription channels that are enabled.

5. The system of claim 4 wherein:

said storage circuit includes output means for applying the old data to said control logic circuit; and said control logic circuit includes logic means responsive to the digital data and the old data for developing the updated data as a function of the mode of operation.

6. The system of claim 3 further including:

an output circuit having an output coupled to the selective gating circuit and inputs coupled to said third, fifth and sixth means for selectively allowing the first, second and third enabling signals to pass to the selective gating circuit.

7. In a subscription television network controlled by a processing center, a system for controlling the operation of a subscriber's television converter, said system comprising:

first means responsive to control data from the processing center for generating channel enabling data for at least one predetermined subscription channel during a first mode of operation, said first means including a control logic circuit responsive to the control data from the processing center for developing updated data and a storage circuit responsive to the updated data for developing old data indicative of the subscription channels that are enabled and for storing the channel enabling data;

second means for developing channel selection data in response to the selection of a subscription channel; and third means coupled to said first and second means and to the converter for generating a first enabling signal when the predetermined subscription channel is the selected channel during the first mode of operation, the converter responding to the first enabling signal for allowing a subscription television program to pass on the selected predetermined subscription channel.

8. The system of claim 7 wherein:

said storage circuit includes output means for applying the old data to said control logic circuit; and said control logic circuit includes logic means responsive to the digital control data from the processing center and the old data for developing the updated data as a function of the mode of operation.

9. In a subscription television network controlled by a processing center, a system for controlling the operation of a subscriber's television converter, said system comprising:

first means responsive to control data from the processing center for generating channel enabling data for at least one predetermined subscription channel during a first mode of operation, said first means including a video register for storing the channel enabling data;

second means for developing channel selection data in response to the selection of a subscription channel;

third means coupled to said first and second means and to the converter for generating a first enabling signal when the predetermined subscription channel is the selected channel during the first mode of operation, the converter responding to the first enabling signal for allowing a subscription television program to pass on the selected predetermined subscription channel; and fourth means for generating a request signal in response to a selection of a first category subscription television program on a preselected channel in a second mode of operation, the processing center being responsive to the request signal for causing said first means to subsequently generate channel enabling data for the preselected channel if the subscriber is authorized to receive the first category program.

10. In a subscription television network controlled by a processing center, a system for controlling the operation of a subscriber's television converter, said system comprising:

first means responsive to control data from the processing center for generating channel enabling data for at least one predetermined subscription channel during a first mode of operation, said first means including a video register for storing said channel enabling data;

second means for developing channel selection data in response to the selection of a subscription channel;

third means coupled to said first and second means and to the converter for generating a first enabling signal when the predetermined subscription channel is the selected channel during the first mode of operation, the converter responding to the first enabling signal for allowing a subscription television program to pass on the selected predetermined subscription channel;

fourth means for generating a request signal in response to a selection of a first category subscription television program on a preselected channel in a second mode of operation, the processing center being responsive to the request signal for causing said first means to subsequently generate channel enabling data for the preselected channel if the subscriber is authorized to receive the first category program; and fifth means, coupled to the converter and said fourth means, being responsive to the request signal in a third scription television site is authorized to receive the first category program.

11. The system of claim 10 further including:

sixth means, coupled to the converter, being responsive to the selection of a non-subscription channel in a fourth mode of operation for generating a third enabling signal to allow the converter to pass a non-subscription program on the selected non-subscription channel.

12. The system of claim 11 further including:

an output circuit having an output coupled to the converter and inputs coupled to said third, fifth and sixth means for selectively allowing the first, second and third enabling signals to pass to the converter.

13. The system of claim 10 wherein said first means includes:

a control logic circuit responsive to control data from the processing center for developing updated data; and a storage circuit responsive to the updated data for developing old data indicative of the subscription channels that are enabled.

14. The system of claim 13 wherein:

said storage circuit includes output means for applying the old data to said control logic circuit; and said control logic circuit includes logic means responsive to the control data from the processing center and the old data for developing the updated data as a function of the mode of operation.

15. The system of claim 14 further including:

an output circuit having an output coupled to the converter and inputs coupled to said third, fifth and sixth means for selectively allowing the first, second and third enabling signals to pass to the converter.

16. A system responsive to digital data from a remote processing center for controlling the operation of a CATV converter of a subscriber, said system comprising:

a storage circuit for storing channel data representative of enabled subscription TV channels;

a control circuit, coupled to the storage circuit, being responsive to the digital data from the processing center and channel data previously stored in the storage circuit for developing updated data as a function of the mode of operation, the updated data being stored as new channel data in said storage circuit;

a channel selector for developing a channel code representing whichever one of a plurality of channels that is selected;

a channel circuit coupled to said channel selector for developing channel selection data in response to the channel code;

a comparison circuit coupled to said storage circuit and to said channel circuit for generating a first enabling signal for a selected channel that is an enabled subscription TV channel;

an output circuit, coupled to said comparison circuit and to the converter, being responsive to the first enabling signal for allowing the converter to pass a selected subscription television program;

a first circuit for generating a first signal in response to a second signal indicative of the request for a selected subscription channel;

a second circuit, coupled to said first, output and channel circuits for generating a second enabling signal when the selected subscription channel is not restricted, said output circuit being responsive to the second enabling signal for allowing the converter to pass a selected non-restricted subscription television program; and a third circuit, coupled to said output circuit, being responsive to the channel code for developing a third enabling signal when the selected channel is not a subscription channel, said output circuit being responsive to the third enabling signal for allowing the converter to pass a selected non-subscription television program.

17. In a CATV system controlled by a processing center for supplying subscription television programs to a plurality of subscription television sites, each site including a television converter and a channel selector control, a control system for controlling the operation of the converter comprising:

logic means responsive to control data from the processing center for storing channel enabling data indicative of whether at least one of a plurality of subscription channels is enabled;

channel means coupled to the channel selector control for developing channel selection data indicative of whether one of the plurality of subscription channels is selected; and first means coupled to the converter, said logic means and said channel means for generating a first enabling signal whenever a selected subscription channel is an enabled subscription channel, the converter responding to the first enabling signal for allowing the subscription television program on the selected subscription channel to pass.

18. The system of claim 17 wherein said logic means comprises:

a storage circuit for storing channel enabling data; and a control circuit coupled to the storage circuit, being responsive to the control data and to the channel enabling data for modifying the channel enabling data as a function of the control data.

19. The system of claim 17 further including:

a request control for generating a request signal when actuated by a subscriber; and second means coupled to the converter and channel selector control and to said request control for generating a second enabling signal whenever the channel selector control is positioned to select a special category subscription program on a subscription channel of a first type and the request control is actuated, the converter responding to the second enabling signal for allowing the special category subscription program to be passed on the subscription channel of the first type.

20. The system of claim 17 further including:

a request control for generating a request signal when actuated by a subscriber; and a first circuit coupled to the request control for generating a request signal in response to the selection of a first category subscription program on a selected subscription channel and to a signal from the request control, the request signal causing the processing center to generate control data if the subscription television site is authorized to receive the first category subscription television program on the selected subscription channel.

21. The system of claim 20 further including:

a second circuit, coupled to said channel means and to said first circuit, for generating a second enabling signal in response to the request signal whenever a second category subscription program on a subscription channel is selected, the converter responding to the second enabling signal for allowing the second category subscription program on the selected subscription channel to pass.

22. The system of claim 21 further including:

third means, coupled to the channel selector control, being responsive to the selection of a non-subscription channel for generating a third enabling signal, the converter responding to the third enabling signal for allowing the non-subscription program on the selected non-subscription channel to pass.

23. The system of claim 22 further including:

a gate circuit having an output coupled to the converter and inputs coupled to said first, second and third means for selectively allowing the first, second and third enabling signals to pass to the converter.

24. In a subscription television network for transmitting subscription television program channels from a central station to a plurality of remotely located subscription television receiver sites, a system comprising:

a television converter at each site for allowing a program on a selected one of the subscription television program channels to pass in response to an enabling signal;

a channel selector at each site for developing a channel code representative of a selected program channel;

a channel circuit at each site coupled to said channel selector for developing channel selection data in response to the channel code;

a first circuit at each site coupled to said channel selector for generating a request signal in response to the selection of a predetermined program on a predetermined program channel;

first means at each site coupled to said first circuit for transmitting the request signal to the central station;

second means at the central station being responsive to a request signal from a site for developing and transmitting control data to that site if the subscriber is authorized to receive the predetermined program channel;

third means at each site selectively responsive to control data specifically transmitted thereto from the central station for developing channel enabling data for the predetermined program channel; and fourth means at each site coupled to said channel circuit, said third means and said converter for generating the enabling signal to allow said converter to pass the predetermined program in response to the coincident occurrence of substantially identical channel enabling and channel selection data, said fourth means including a video register for storing said channel enabling and selection data.

25. In a subscription television network including a central station for transmitting a plurality of subscription television program channels to a plurality of remotely located subscription television receiver sites and for selectively receiving signals therefrom, a system at each site comprising:

a television converter for allowing a program on a selected one of the subscription television program channels to pass in response to an enabling signal;

a channel selector for developing a channel code representative of a selected program channel;

a channel circuit coupled to said channel selector for developing channel selection data in response to the channel code;

a first circuit coupled to said channel selector for generating a request signal in response to the selection of a predetermined program channel containing a predetermined program;

transmission means coupled to said first circuit for transmitting the request signal to the central station, the central station being responsive to the request signal from a site for developing and transmitting control data to that site if that site is authorized to receive the predetermined program channel;

first means responsive to control data specifically transmitted thereto from the central station for developing channel enabling data for the predetermined program channel, said first means including a video register for storing said channel enabling data; and second means, coupled to said channel circuit, said first means and said converter, being responsive to the coincident occurrence of substantially identical channel enabling and channel selection data for generating the enabling signal to allow said converter to pass the predetermined program.

26. A subscriber type television system having a plurality of channels for carrying television programs to remote subscriber terminals, comprising in combination:

a central television program gathering facility including a computer controlled processing center;

a cable distribution network; and a plurality of subscriber terminals, each connected to a television receiver, said terminals being linked by means of the cable distribution network to the processing center, said system having means for providing at least one of the following modes of operation, consisting of:

first means for providing preview enabling commands to the terminals so as to enable any of said terminals to preview any of the programs for a predetermined period of time free of charge;

second means for providing video enable commands to the particular one of the terminals making demand upon any of the programs restricted for viewing by a particular subscriber class and transmitting the restricted program on a pay basis wherever authorized, or inhibiting transmission of the demanded restricted program if unauthorized to receive same;

third means for providing a video enabling command to the particular one of the terminals making demand for transmission of any of the non-restricted pay programs and billing the demanding subscriber for the channel selected;

fourth means for providing any of the subscriber terminals access to any of the channels allocated for communication of non-subscription television programs for viewing on the television receiver of the particular subscriber requesting same, free of charge; and means for controlling and storing channel enabling data responsive to any one of the first, second and third means so as to enable subscriber switching between the channels carrying the programs purchased without repetition by the subscriber of purchase requests therefor.

27. The invention as stated in claim 26, wherein the means for providing video enabling commands being accomplished without the aid of computer control.

28. The invention as stated in claim 26, wherein each of the terminals includes a formatter and transmitter unit for internally combining a pay television request signal and channel request coded signal with a generated station address code signal.

29. The invention as stated in claim 26, wherein each one of the subscriber terminals comprises:

a logic control circuit responsive to enabling, disabling and channel data;

a video register responsive to outputs from the logic control circuit;

a subscription channel decoder responsive to channel code signals; and a channel comparator responsive to outputs from the video register and the subscription channel decoder for providing subscription enabling outputs therefrom.

30. The invention as stated in claim 29, including logic means responsive to the subscription channel decoder for enabling reception of programs in the non-restricted mode.

31. The invention as stated in claim 30, including a formatter and transmitter, and means responsive to channel code inputs for providing a pay television request signal to the formatter and transmitter.

32. A method in a closed circuit system composed of a central facility for gathering television programs and having a computer processing center thereat for processing and transmitting said programs to a plural number of remote subscriber terminals, each equipped with a television receiver, comprising the steps of:

initiating a coded demand by any of the terminals upon the computer processing center to release any of said programs for preview at any of the terminals for a predetermined period of time; and verifying the coded demand by the computer processing center to determine authority of subscriber terminal to make same, and if authorized unscrambling and transmitting the demanded program to the terminal requesting same free of charge for said predetermined period of time.

33. The invention as stated in claim 32, including the further steps of:

initiating demand at any of the terminals for viewing a preselected pay program restricted to a particular class of subscribers;

verifying authority of subscriber to receive the particular restricted program; and transmitting the preselected pay program for said viewing upon confirmation of said authority.

34. The invention as stated in claim 32, including the further steps of:

initiating a demand at any of the terminals for viewing a preselected pay program; and transmitting the preselected pay program for said viewing and charging subscriber therefor.

35. The invention as stated in claim 32, including the further steps of:

initiating a demand for viewing any non-subscription television programs by any of said terminals; and enabling the terminals initiating said demand to receive the non-subscription programs free of charge.

* * * * *

UNITED STATES PATENT OFFICE

CERTIFICATE OF CORRECTION

PATENT NO. : 3,790,700

DATED : February 5, 1974

INVENTOR(S) : Richard T. Callais, et al.

It is certified that error appears in the above-identified patent and that said Letters Patent are hereby corrected as shown below:

Claim 4, Column 13, line 5 should read:

a storage circuit within said video register coupled to

Claim 8, Column 14, line 18 should read:

sponsive to the control data from the pro—

Claim 10, Column 15, lines 18 and 19 should read:

third mode of operation for generating a second enabling signal to allow the converter to pass a second category subscription television program on the selected subscription channel.

Signed and Sealed this

Sixteenth Day of November 1976

[SEAL]

*Attest:*

RUTH C. MASON
*Attesting Officer*

C. MARSHALL DANN
*Commissioner of Patents and Trademarks*